United States Patent

[11] 3,553,358

[72] Inventor George Lauer
Hollywood, Calif.
[21] Appl. No. 676,672
[22] Filed Oct. 13, 1967
[45] Patented Jan. 5, 1971
[73] Assignee North American Rockwell Corporation

[54] LINE INTENSITY INTEGRATING AUTOMATIC DATA ACQUISTION SYSTEM
3 Claims, 8 Drawing Figs.

[52] U.S. Cl. .......... 178/6.8
[51] Int. Cl. .......... H04n 3/00
[50] Field of Search .......... 178/6.8, 6IND, 6BWR, 7.7; 250/83.3IR

[56] References Cited

UNITED STATES PATENTS

| | | | |
|---|---|---|---|
| 3,262,098 | 7/1966 | Lebell .......... | 178/6 Compt |
| 3,304,506 | 2/1967 | Weekes .......... | 328/151 |
| 3,337,766 | 8/1967 | Malaby .......... | 315/18 |
| 3,347,981 | 10/1967 | Kagan et al. .......... | 178/6BWR |
| 3,229,272 | 1/1966 | Cohen et al. .......... | 340/206 |

OTHER REFERENCES

Analog-Digital Conversion Techniques pp 1— 6

*Primary Examiner*—Robert L. Griffin
*Assistant Examiner*—Donald E. Stout
*Attorneys*—H. Fredrick Hamann and Henry Kolin

ABSTRACT: A television camera is used to scan a visual presentation of optically perceivable data in the form of lines of light under the control of a digital computer. A converter, responsive to the camera output, integrates the output signal over any selected television scan line, and generates a digital output representative of the scanned data. This data is then processed by the digital computer which also controls the camera scan.

INVENTOR.
GEORGE LAUER

BY
A. Fredrich Hamann
ATTORNEY

INVENTOR.
GEORGE LAUER

BY
[signature]

ATTORNEY

LINE INTENSITY INTEGRATING AUTOMATIC DATA ACQUISTION SYSTEM

BACKGROUND

The present invention in its preferred embodiment relates to apparatus for automatically measuring the intensity of optically perceivable data, e.g., a special display, as a function of intensity and wavelength.

In existing systems spectral data are obtained either by using a detector and varying the wavelength of the incident beam so that the whole spectrum can be covered or a photographic image of the spectrum is first taken and then a densitometer is used to determine the amount of light that has fallen at each spectral line. Alternatively, a number of detectors may be placed at chosen spectral lines and all the chosen lines recorded simultaneously. However, each of these prior art methods have major disadvantages, especially for routine analytical investigations. The primary advantage of the present invention over these methods is the speed, accuracy and relative ease with which the spectral data may be acquired, measured, recorded and processed in digital form.

SUMMARY

The invention is directed to an automatic spectral data acquisition system whereby optically perceivable data is scanned by an electro-optical means under the control of a computer and converted into an electric signal which is fed into the computer in digital form and processed according to a predetermined program.

Therefore, it is an object of the present invention to provide an automated means for scanning visual data in the form of spectral lines, producing an electrical representation of the integral of such data in a digital form and processing the integral of such data according to a predetermined program to provide a preselected output.

This and other objects of the present invention will become more apparent from the following detailed description of various embodiments of the present invention taken together with the drawings, hereby made a part thereof in which:

DESCRIPTION OF PREFERRED EMBODIMENT

Figure 1:
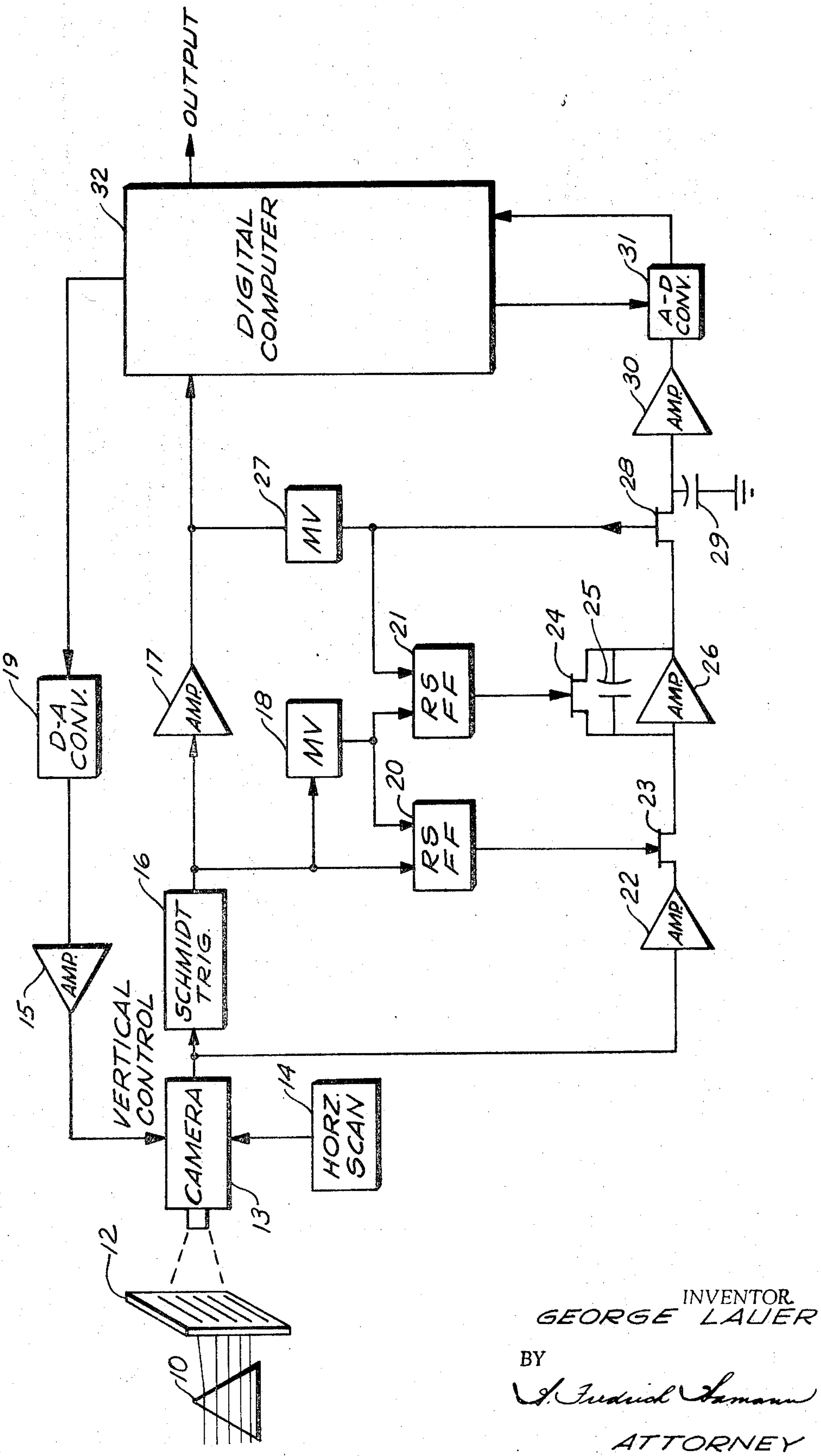
FIG. 1 is a circuit diagram of the preferred embodiment.

Referring now the drawings and FIG. 1 in detail a means 10 is utilized for generating a display of optically perceivable data by dispersing radiation into spectral lines and projecting such lines onto a display screen 12. The dispersing means 10 and display screen 12 may be any well-known spectrometric apparatus for producing a display of spectral line representative of the components of the radiation under examination. Dispersing means 10 could be a mass spectrometer or merely a prism, and display screen 12 could be a scintillator or a semitransparent or phosphor screen, respectively. Other arrangements for generating optically perceivable data displays may also be used. For example, see copending application of Raymond A. Meyer, Ser. No. 675,254, now U.S. Pat. 3,509,449, filed Oct. 13, 1967 entitled "Spectral Data Acquisition System," the disclosure of which is incorporated herein by reference.

A television camera 13, of the vidicon or image orthicon type scans a selected spectral line on display screen 12 under the control of a standard horizontal scanning means 14. The output of camera 13 is fed through amplifier 22 and field-effect transistor switch 23 to the input of the electronic integration circuit which comprises the internal resistance of switch 23 in series with the parallel combination of capacitor 25 and amplifier 26.

The integrated signal is then fed through field-effect transistor switch 28 to capacitance 29. When switch 28 is open, the value stored on capacitance 29 at that time is fed through high input impedance amplifier 30 to an analogue to digital converter 31. The converter 31 feeds a digital representation of the value stored on capacitance 29 to digital computer 32 on command from computer 32.

The output of camera 13 is also fed to schmidt trigger 16. The output of schmidt trigger 16 is fed to line driver 17 monostable or astable multivibrator The output of multivibrator 18 is fed to one input of set-reset flip-flop 21 and the other input of flip-flop 20. The output of flip-flop 20 controls transistor switch 23. The output of multivibrator 27 controls transistor switch 28 and is also fed to the other input of flip-flop 21. The output of flip-flop 21 controls the field-effect transistor switch 24 connected in parallel with capacitance 25 and amplifier 26. When transistor switch 24 is closed the integrator circuit is reset to an initial condition.

Figure 2A:
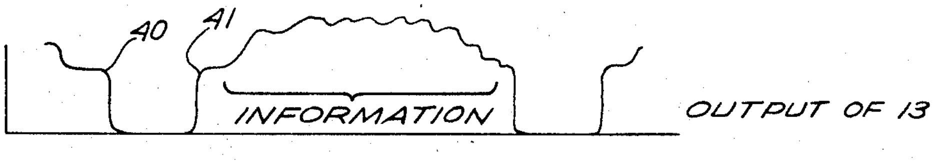
FIGS. 2*a*-2*g* are graphical representations of the output of the components of the preferred embodiment shown in FIG. 1.

In operation the schmidt trigger 16 is triggered by the blanking pulse from standard horizontal scanning means 14 which is impressed on the video signal from camera 13 at the completion of each scan (see 40 and 41 of FIG. 2*a*). This horizontal blanking pulse which is generated in the usual manner is used not only for blanking the beam during the horizontal retrace but also for synchronizing the computer control. The vertical blanking pulse ordinarily generated is not used in the present invention since the vertical scan is under the control of computer as described in detail hereinafter.

Figure 2B:
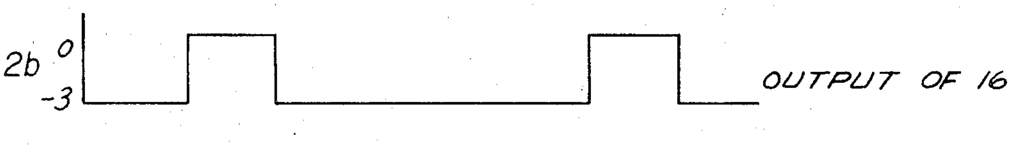

The positive going pulse from schmidt trigger 16 (see FIG. 2*b*) sets flip-flop 20 (see FIG. 2*f*) thereby opening switch 23 to remove the video signal from 26. The pulse from schmidt trigger 16 is also amplified by line driver 17 and fed to monostable or astable multivibrator 27, triggering it to a negative level (see FIG. 2*c* which closes switch 28. This allows the integrated information signal pass from amplifier 26 (see FIG. 2*g*) to sample and storage capacitor 29 where it will later be converted to digital form and fed to computer 32 as explained above. The pulse width at the output of multivibrator 27 is selected, e.g. 2 $\mu$sec. so that the sample and hold circuit has ample opportunity to transfer the signal through the resistance of switch 28 to the capacitor 29.

Figure 2C:
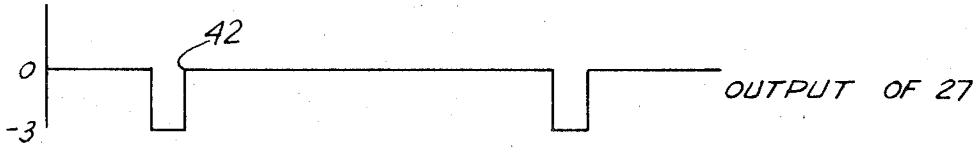

When multivibrator 27 returns to its stable state at 42 in FIG. 2*c*, switch 28 is opened. Flip-flop 21 is also set by the positive going output of multivibrator 27, as shown in FIG. 2*e*, and closes switch 24 which resets the integrating circuit to an initial condition.

Figure 2D:
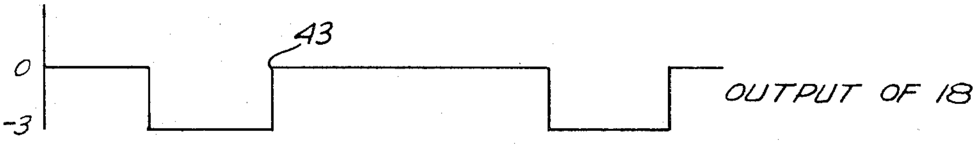
Figure 2E:
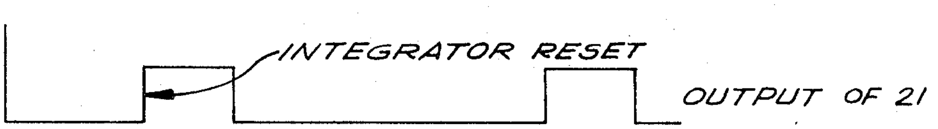
Figure 2F:
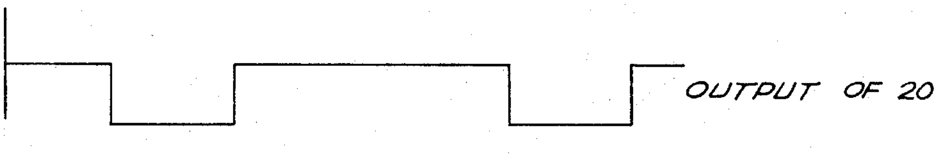
Figure 2G:
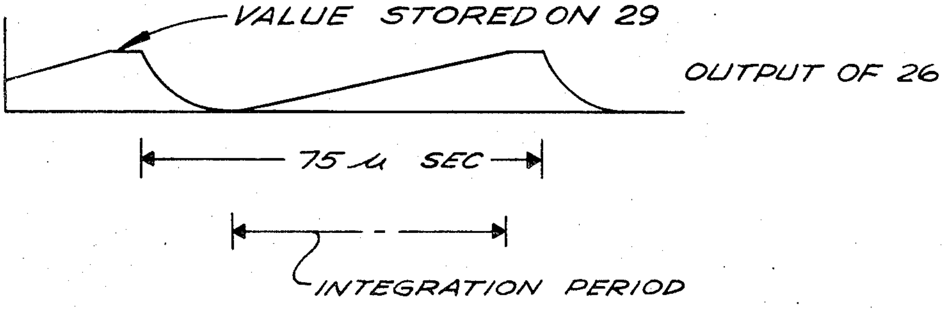

Flip-flops 20 and 21 are reset at 43 (see FIGS. 2*d* and 2*e* when multivibrator 18 returns to initial condition thereby closing switch 23 and opening switch 24, respectively. The length of time that an output is generated by multivibrator 18 variable and is selected so the charge on capacitor 29 has decayed essentially to zero before integration is started (see FIGS. 2*d* and 2*g*).

The amplified pulse from line driver 17 at the end of a scan is also fed to computer 32, interrupting the data processing program momentarily and initiating a digital command signal to the digital to analogue converter 19. The analogue representation of the digital command is amplified by amplifier 15 and is fed to the vertical control circuits of camera 13 to move the vidicon electron beam to another scan line of predetermined position. It would also be possible to have the camera 12 scan only the spectral lines and skip over dark regions but this might miss incomplete or discontinuous spectral lines. Increment size may be altered at will to optimize, n.g. time vs. resolution, to fit any analytical problem. Depending upon actual line width the increment can be made sufficiently small so that no spectral line is unscanned. The computer 32 keeps count of the increments needed to reach each spectral line so that the relative position of these lines become part of the data.

The computer 32 may be programmed to process the spectral data in a number of ways. In the preferred embodiment the computer 32 gives a digital output representative of the intensity of each spectral line and the position of each line, the latter being indicative of the relative wavelengths of the components of the radiation.

The computer 32 could also store the output from each scan and sum the output for a particular line from frame to frame. In a similar manner the computer 32 could compare the change in intensity for a selected spectral line from frame to frame and thus do a time series study of the intensity of that spectral line. All of these methods of operating a digital computer are apparent to those skilled in the art and therefore are not described in detail herein. The use of a digital computer to control the scan of visual data is described in U.S. Pat. No. 3,347,981, Method for transmitting Digital Data in Connection with Document Reproduction System, S. Kagan et al. issued Oct. 17, 1967. In that patent, a general purpose digital computer 23 generates data which is applied to the D/A converter 28 to control scanner 22 for tracing out a predetermined path. The procedure can be reversed so that readout is achieved by causing the projection of the beam of a cathode ray tube to be deflected to a location on a negative 27 corresponding to an address in memory. Upon completion of readout, the negative can be used in a conventional manner to produce a reproduction of the original document. Other patents which show scan control are U.S. Pat. No. 3,287,496 to James E. Webb for a Digital Television Camera Control System, issued Nov. 22, 1966 and U.S. Pat. No. 3,333,056 to W. K. Pratt for a Digital Bandwidth Reduction System, issued July 25, 1967.

If the display on screen 12 represents a continuum of spectral lines with a intensity peak around a certain wavelength the computer 32 can give an integration of the area under the intensity peak with respect to the wavelenth of the radiation. Similarly, the computer 32 can be programmed to do a time series study of the peak intensity in relation to the radiation wavelength.

The computer used in the preferred embodiment is a standard Digital Equipment Corporation Model PDP-8 digital computer. Clearly, other commercially available digital computers could be utilized if they could function to control the camera scan, initiate the analogue to digital conversion, store information and process the data received and stored to generate an output as determined by the computer program. Such computers are well known in the art, as are the methods and techniques for programming them, and will not be described in detail.

The present invention is not limited to the specific details of the particular embodiment described, since many modifications will be apparent to those skilled in the art such as controlling both vertical and horizontal movements of camera 13 by computer 32. Further, the specific components such as schmidt trigger 16, camera 13, etc., have not been shown in detail as they are all standard electronic circuits well known in the art. Therefore, the scope of the present invention is limited only by the appended claims.

I claim:

1. An automatic data acquisition system comprising:
electro-optical means for scanning optically perceivable data and providing therefrom an electrical signal;
conversion means responsive to said electro-optical means that generates as an output signal the integral of said electro-optical signal;
programmed computing means for receiving the output of said conversion means and processing said output in a predetermined manner, said computing means generating an output signal that varies as said perceivable data varies;
means responsive to said computing means for controlling the scanning by said electro-optical means;
said electro-optical means comprising an electronic camera tube having an electron beam therein;
means for deflecting said electron beam along a first axis;
blanking pulse means responsive to said first axis deflection means for producing an output signal between selected degrees of deflection of said electron beam;
said conversion means including control means responsive to said blanking pulse means, a first switching means responsive to said control means and interposed between said electronic integration means and the input to said conversion means from said electro-optical means, said control means opening said first switch means for the duration of said output from said blanking pulse means.

2. The system of claim 1 including a second switching means responsive to said control means interposed between said electronic integration means and a sampling and storing means, said control means closing said second switching means during a firs portion of said output of said blanking pulse means.

3. The system of claim 2 including resetting means responsive to said control means for resetting said electronic integration means to an initial condition during the remaining portion of said output of said blanking pulse means.